Aug. 4, 1953  G. L. VAN GASTLE  2,648,016
AUTOMATIC STARTER-ENERGIZING CIRCUIT FOR AUTOMOTIVE VEHICLES
Filed Dec. 15, 1950
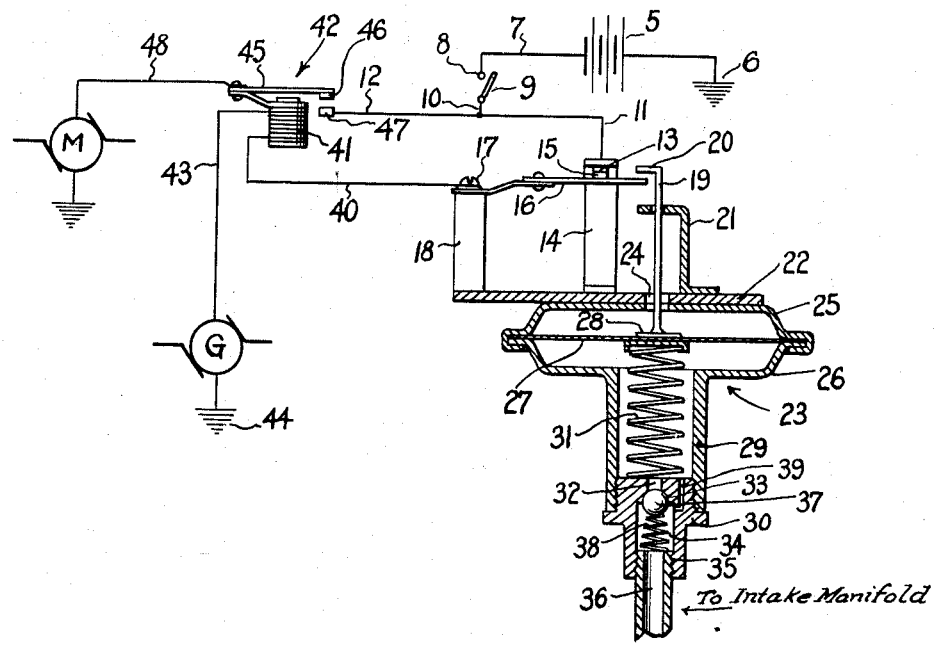
INVENTOR
GRANT L. VAN GASTLE, DECEASED
By SHIRLEY A. VAN GASTLE, ADMINISTRATRIX
BY *W. S. McDowell*
ATTORNEY Patented Aug. 4, 1953

2,648,016

UNITED STATES PATENT OFFICE 2,648,016

AUTOMATIC STARTER-ENERGIZING CIRCUIT FOR AUTOMOTIVE VEHICLES

Grant L. Van Gastle, deceased, late of Columbus, Ohio, by Shirley A. Van Gastle, administratrix, Columbus, Ohio, assignor to Shirley A. Van Gastle, Columbus, Ohio Application December 15, 1950, Serial No. 200,977

1 Claim. (Cl. 290—38)

The present invention relates to devices for automatically energizing the starter motors of automotive vehicles, and more specifically to an improved electrical circuit which is operable automatically, in response to conditions of an automotive engine, to open or close an operating circuit for the starter motor of an automotive vehicle.

In the past, it has been proposed to provide automatic starter energizing circuits which are operable, in response to the closure of a switch controlled by the stopping or starting of an associated engine, to automatically energize the starter motor circuit of the vehicle, thereby to drive the associated engine and to start the same. The prior art discloses electrical circuits having connections between the battery of a vehicle and the starter motor thereof, and in which is interposed one or more switches which are closed to energize the starter motor circuit in response to the inoperation of a motor-driven generator of the vehicle. Other circuits have been proposed which contain switches actuated in response to pressures within the intake manifold of an associated engine.

It follows, therefore, that the primary object of this invention is to generally improve upon previously known, described, and patented circuits of this type through the provision of an improved automatic starter motor-energizing circuit operable to energize the starter motor of the vehicle in response to a complete stoppage of the engine of the associated vehicle.

It is another object of the invention to provide an automatic starter circuit which is effective to prevent energization of the starter motor when the associated engine of the vehicle is operative, regardless of the speed or load conditions of such engine.

A further object of the invention is to provide an automatic starter circuit for automotive vehicles which comprises a relay switch interposed between the storage battery and the starter motor of the automotive vehicle, and wherein such relay switch is operable automatically to close an operating circuit to the starter motor in response to the combined conditions of manifold pressure within the engine, and the output conditions of the generator of the automotive vehicle.

For a further and more detailed understanding of the present invention and the various additional objects and advantages ambient thereto, reference is made to the following description and the accompanying drawing, wherein the single figure illustrates in diagrammatic form the elements comprising the present automatic starter circuit.

Referring now to the drawing, the numeral 5 designates the storage battery of an automotive vehicle having one pole grounded, as at 6, to the frame of the vehicle in the ordinary manner. The opposite pole of the battery 5 is connected by a lead 7 with the stationary contact 8 of the ordinary key-operated ignition switch 9. The opposite contact of the switch 9 is connected with a lead 10 which branches into two separate conductors 11 and 12 respectively. Conductor 11 is electrically connected with a contact point 13 stationarily carried upon an insulated bracket 14. Cooperative with the stationary contact point 13 is a relatively engageable movable contact 15 carried upon a resiliently flexible switch arm 16. The inner end of the arm 16 is connected, as at 17, with a second stationary insulating bracket 18, and has its opposite outer end extending beyond the contact 15 and engageable with a vertically movable shaft or rod 19. The rod 19 is hooked at its outer end, as at 20, while the intermediate straight portion of the rod is guided for vertical movement within an opening formed in a bracket 21 which is carried by, and extends upwardly from, a supporting base 22. Preferably, the rod 19 is formed from a suitable dielectric material in order to prevent the passage of electrical current through the arm 19 and the various elements of a vacuum-actuated diaphragm, generally indicated by the numeral 23, with which the rod 19 is connected. The rod 19 extends downwardly from its hooked end 20 through openings 24 provided in the base 22 and the upper section 25 of the diaphragm housing. Joined with the outer marginal edge region of the upper section 25 of the housing is a lower housing section 26 which has its outer marginal edges tightly fitting the overlapping outer marginal edge of the upper section 25. Interposed and carried between the mating marginal edge regions of the sections 25 and 26 is a continuous uninterrupted resiliently flexible diaphragm 27, the central portion of which is connected with the lower end of the rod, as at 28. The lower section 26 of the housing defines with the under surface of the diaphragm 27 a substantially enclosed chamber which terminates in a relatively reduced throat section 29 closed by a screw-threaded plug 30. Interposed between the inner end of the plug 30 and the lower surface of the diaphragm 27 is a relatively light coil compression spring 31 which is arranged to urge the diaphragm upwardly within the housing and to consequently raise the shaft 19 out of engagement with the outer end of the switch arm 16. The screw-threaded plug 30 is provided with a first axial bore 32 which communicates with the interior of the enclosed chamber defined by the lower section of the diaphragm housing, and which terminates at its outer end in a tapered valve seat region 33. The plug 30, adjacent to the valve seat region 33, is provided with a relatively larger bore 34 terminating in an internally screw-threaded conduit connection 35. Threadedly carried within the conduit connection 35 of the plug 30 is a remotely extending conduit 36 which communicates at its opposite end with the intake manifold of an automotive engine, not shown. Positioned within the relatively enlarged bore 34 of the plug, and cooperative with the valve seat region 33, is a spherical ball check valve 37. The ball 37 is engaged on one side by a light coil compression spring 38 which has its opposite end seated on the end of the conduit 36. Thus, it will be seen that the plug 30 embodies an internal check valve operable to permit the flow of fluid in a direction from the lower section of the housing 26 toward the conduit 36, while preventing the passage of fluid in the opposite direction. Disposed in by-passing relation to the check valve is a relatively restricted orifice 39 formed in the walls of the plug 30 and communicating, respectively, with the bore 34 and the interior of the housing beneath the diaphragm 27. The purpose of the restricted orifice 39 will be hereinafter more fully explained in connection with the operation of the present starter circuit.

The inner end 17 of the switch arm 16 is electrically connected with a lead 40 which, in turn, extends to one of the terminals of the winding 41 of an electro-magnetic relay switch, generally indicated by the numeral 42. The opposite end of the winding 41 is connected by a conductor 43 with the armature pole of an electrical generator G which is driven by the engine of the automotive vehicle, and which is grounded, as at 44, to the frame of the vehicle. Carried in magnetic relation to the winding of the relay 42 is a resiliently flexible switch arm 45 which is provided at its outer end with a contact point 46. The arm 45 is moved in response to the energization of the winding 41 to a position of closure with respect to a second stationary contact 47 electrically connected with the lead 12. The opposite end of the switch arm 45 is electrically connected by a conductor 48 with the starter motor M in a manner to provide for the passage of operating current to such motor upon closure of the relay switch 42.

In operation, assuming the engine of the vehicle to be idle, or stopped, and the ignition switch 9 to be open as shown in the drawing, the flexible diaphragm 27 will occupy its uppermost position within the housing, and the rod 19 carried by the diaphragm will be disengaged from and spaced above the outer end of the switch arm 16. Due to the resiliency and arrangement of the switch arm 16, the contact 15 carried thereby will remain in engagement with the stationary contact 13. When it is desired to start the engine of the associated vehicle through energization of the starter motor M, the ignition switch 9 is closed. Under this condition, operating current from the battery 5 passes through the lead 7, the switch 9, the lead 11, the closed contact points 13 and 15, the switch arm 16, the conductor 40, the winding 41, the conductor 43, and to the idle and grounded generator G. This completes an operating circuit for the coil 41 of the relay switch 42, thus energizing the coil and causing the flexible switch arm 45 to move downwardly and engage the contact 46 with the stationary contact 47. Upon the engagement of the contacts 46 and 47, an energizing circuit for the starter motor M is completed from the switch 9, leads 10 and 12, points 46 and 47, switch arm 45, and conductor 48. Thus, upon energization of the motor M, which is drivingly connected in the usual manner with the engine of the vehicle, the engine is started. Immediately following the starting of the engine, reduced pressures are established within the intake manifold of the engine, the conduit 36, and the bore 34 of the plug 30. Such reduced pressures act to unseat the valve 37, in opposition to the force of the spring 38, providing unrestricted communication between the intake manifold and the underside of the diaphragm 27. The suction created by such reduced pressures acts to flex the diaphragm 27 and the shaft 19 carried thereby downwardly to engage the hooked portion 20 of the shaft with the outer end of the switch arm 16, moving the latter downwardly and breaking contact between the points 13 and 15. This, in turn, is effective to cause the deenergization of the coil 41 and a consequent separation of the points 46 and 47 to break the operating circuit for the starter motor M. Simultaneously with the starting of the engine, the generator G is driven to provide current output through the conductor 43 toward the winding 41. Under certain conditions of operation of the engine under relatively extreme load conditions, such as are created by the sudden opening of the throttle valve of the carburetor of the engine, the intake manifold pressure within the engine is materially increased to reduce the vacuum forces acting upon the diaphragm 27 to normally hold the contacts 13 and 15 out of engagement. Under such conditions, assuming that a sudden loss of vacuum within the intake manifold of the engine were to occur, the diaphragm 27 would normally flex upwardly to permit the contacts 13 and 15 to become engaged and thereby energize the winding 41 of the relay 42. To eliminate this possibility, the check valve 37 is provided to prevent a sudden upward flexing of the diaphragm 27 in response to a sudden loss of vacuum within the intake manifold of the engine. In this connection, the relatively restricted orifice 39 acts as a time delay means in permitting the diaphragm 27 to return to its upward position as shown in the drawing, and to prevent immediate equalization of pressures between the diaphragm chamber and the bore 34 of the plug 30 which communicates directly with the intake manifold of the engine. Thus, upon a sudden dissipation of manifold vacuum, the diaphragm 27 will not immediately flex upwardly to permit closure of the contacts 13 and 15, but will rise gradually to eventually permit closure of such contacts in the event of a prolonged absence of vacuum in the intake manifold of the engine, such as would be occasioned by stalling or complete stoppage of the engine.

As an additional safeguard against energizing the starter motor M when the engine of the vehicle is running, the connection constituting the conductor 43 which extends between the generator and the coil 41 functions, when the generator G is charging, to pass current to the coil 41 in opposition to current passing to the coil from the battery 5, in the event of closure of the contacts 13 and 15 due to a prolonged reduction in vacuum within the manifold of the associated engine without actually stalling or stopping the engine. Such a prolonged reduction in vacuum pressures within the intake manifold of the engine may be visualized to occur in an instance where the vehicle is climbing a relatively steep incline, and where the operator of the vehicle fully opens the throttle valve of the carburetor of the engine. In such instance, the engine will remain running, but the diaphragm 27 will gradually rise upwardly to permit engagement of the contacts 13 and 15. Yet, at the same time, the generator G passes current through the conductor 43 in opposition to current which passes from the battery 5 to the winding 41 upon closure of the contacts 13 and 15, thus rendering the winding 41 ineffective to attract the arm 45 and preventing closure of the contacts 46 and 47. To stop the engine, it is necessary only to open the ignition switch 9 in the usual manner, at which time operating current from the battery 5 is prevented from entering the starter circuit.

In view of the foregoing, it will be seen that the present invention provides a useful and efficient automatic starting circuit for automotive vehicles which functions positively to establish an energizing circuit for the starter motor of the vehicle upon closure of the associated ignition switch and at any time when the engine of the vehicle is stopped. Further, the present circuit is characterized by its positive action in preventing undesired energization of the starter motor at any time during operation of the associated engine, thereby eliminating the danger of damage to the driving mechanism between the starter motor and the engine. Automatic starter circuits formed in accordance with the present invention are characterized by relatively few and simple parts and their consequent economy of manufacture.

It is claimed:

In an automatic starter circuit for an automotive vehicle having an engine provided with a fuel intake manifold, a starter motor energizable to drive said engine, and a storage battery; an electromagnetic relay switch having a field winding and switch contacts electrically connected in series with said battery and starter motor, the winding of said relay switch being energizable to close an operating circuit for said starter motor; a second normally closed switch electrically connected in series with said battery and the winding of said relay switch, said second switch including a resiliently flexible contact-carrying arm movable to open said second switch; means defining an enclosed fluid pressure chamber; a movable pressure-responsive member in said chamber; conduit means connecting said chamber with the intake manifold of said engine; a switch actuator arm carried by said pressure-responsive member and engageable with the contact-carrying arm of said second switch to open the latter upon movement of said pressure-responsive member in response to subatmospheric pressures within the intake manifold of said engine; a check-valve positioned in said conduit means and arranged to interrupt the flow of fluid in a direction from said intake manifold toward said presure-responsive member, but to permit the free flow of fluids in the opposite direction; and restricted orifice means arranged in bypassing relation to said check valve for permitting only restricted flow of fluid in a direction from said manifold toward said pressure-responsive member.

SHIRLEY A. VAN GASTLE,
*Administratrix of estate of Grant L. Van Gastle, deceased.*

References Cited in the file of this patent

UNITED STATES PATENTS

| Number | Name | Date |
|---|---|---|
| 1,635,078 | Gilbert | July 5, 1927 |
| 1,739,069 | Hasselbring, Jr. | Dec. 10, 1929 |
| 1,744,868 | Cox | Jan. 28, 1930 |
| 1,875,192 | Middleton | Aug. 30, 1932 |
| 1,993,070 | Middleton | Mar. 5, 1935 |
| 2,007,058 | Maurer | July 2, 1935 |
| 2,026,095 | Middleton | Dec. 31, 1935 |
| 2,497,462 | McCracken | Feb. 14, 1950 |